Figure 1:
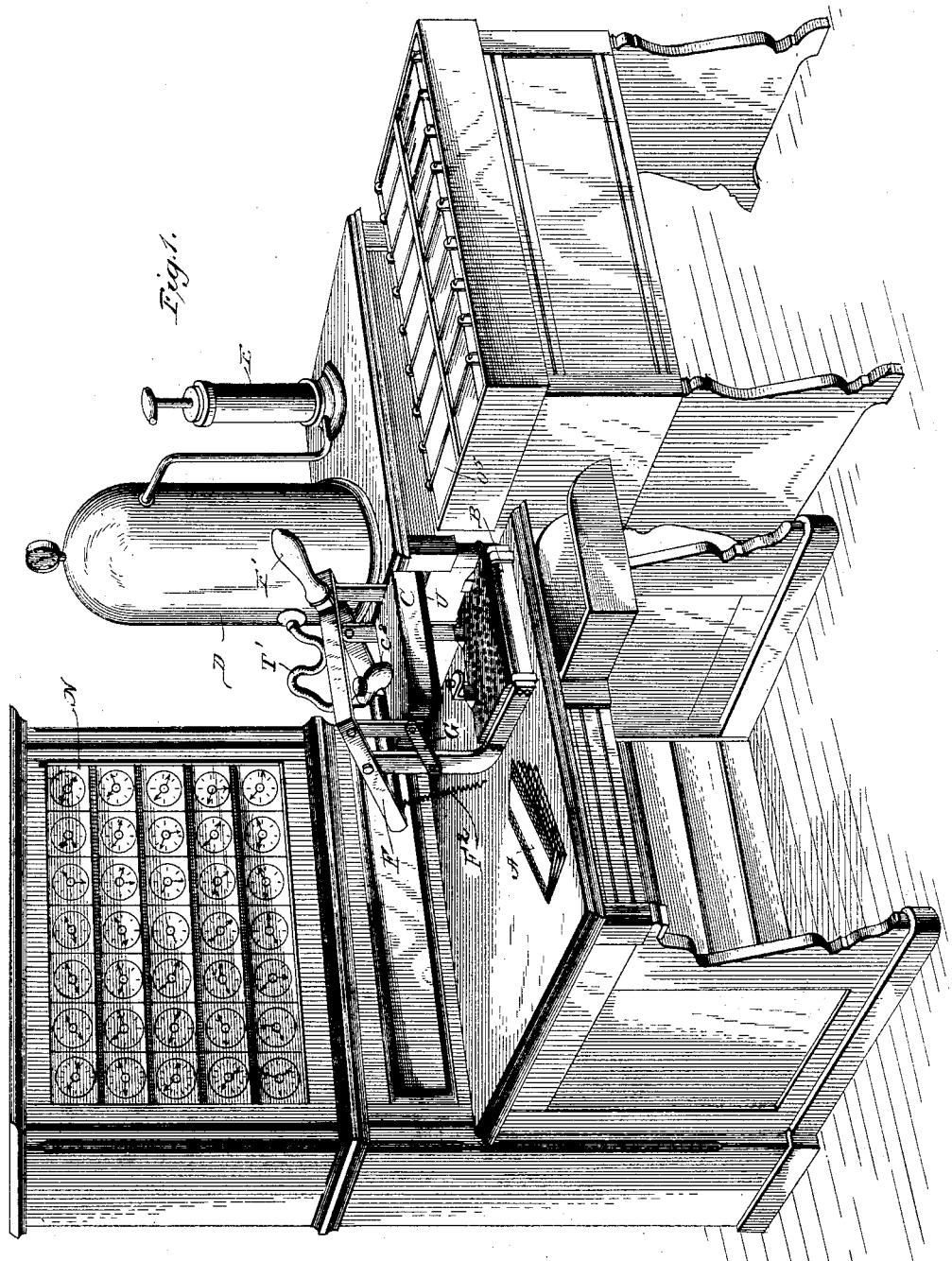

(No Model.) 5 Sheets—Sheet 1.

H. HOLLERITH.
MACHINE FOR TABULATING STATISTICS.

No. 526,130. Patented Sept. 18, 1894.

Witnesses:
Harry B. Rohrer
Thomas Durant

Inventor:
Herman Hollerith
By Church & Church
his Attorneys.

(No Model.) 5 Sheets—Sheet 2.

H. HOLLERITH.
MACHINE FOR TABULATING STATISTICS.

No. 526,130. Patented Sept. 18, 1894.

Witnesses:
Harry S. Rohrer.
Thomas Durant

Inventor:
Herman Hollerith
By Church Church
his Attorneys.

(No Model.) 5 Sheets—Sheet 3.
H. HOLLERITH.
MACHINE FOR TABULATING STATISTICS.

No. 526,130. Patented Sept. 18, 1894.

(No Model.)   H. HOLLERITH.   5 Sheets—Sheet 5.
MACHINE FOR TABULATING STATISTICS.

No. 526,130.   Patented Sept. 18, 1894.

Witnesses:   Inventor:

United States Patent Office.

HERMAN HOLLERITH, OF WASHINGTON, DISTRICT OF COLUMBIA.

MACHINE FOR TABULATING STATISTICS.

SPECIFICATION forming part of Letters Patent No. 526,130, dated September 18, 1894.

Application filed August 20, 1892. Renewed March 6, 1894. Serial No. 502,592. (No model.)

*To all whom it may concern:*

Be it known that I, HERMAN HOLLERITH, of Washington, in the District of Columbia, have invented certain new and useful Improvements in Machines for Compiling or Tabulating Statistics; and I do hereby declare the following to be a full, clear, and exact description of the same, reference being had to the accompanying drawings, forming a part of this specification, and to the letters of reference marked thereon.

In Letters Patent of the United States No. 395,781, granted to me January 8, 1889, I have shown, described and claimed certain new and useful improvements in the art of compiling statistics involving, among other things, the use of a series of separate record cards, each representing an individual or subject and having applied to it, at predetermined intervals, certain circuit controlling index-points arranged according to a fixed plan of distribution, to represent each item or characteristic of the individual or subject, and involving also the use of certain circuit controlling devices acted upon by the index-points to designate each statistical item represented by one or more of said index points. The index-points applied to the cards are described in the patent as consisting, preferably, of perforations punched in the cards, and the circuit controlling devices with which the index-points or perforations in the cards co-operate, as consisting of a bed plate provided with a series of contacts forming the terminals of a system of electric circuits, and a reciprocating platen carrying a series of contact points or pins corresponding in number and arrangement to perforations in the cards—said circuit controlling devices being adapted to render operative a series of electro-mechanical counters and a series of electro-mechanically controlled sorting boxes and indicators connected to the aforesaid system of electric circuits, as will be more fully and at large appear by reference to the patent itself.

My present invention represents another embodiment of the fundamental principle of my said former invention; that is to say, I still preferably use record cards (though I may use record strips in lieu thereof) having perforations constituting index-points, but instead of having such cards operate to control electric circuits and electrically operated counters, sorting boxes and other devices as heretofore, I now have said cards operate to control pneumatic or other fluid pressure circuits or ducts in such manner as to operate suitable counters, sorting boxes, &c., by such fluid pressure. In other words, I cause fluid pressure to perform substantially the functions of the electric currents employed in the former apparatus. In thus adapting or modifying my former invention I have devised what I believe to be certain novel improvements in the art as well as novel improvements in specific mechanism, all which I will first describe at length and then point out particularly in the claims at the close of this specification.

Figure 2:
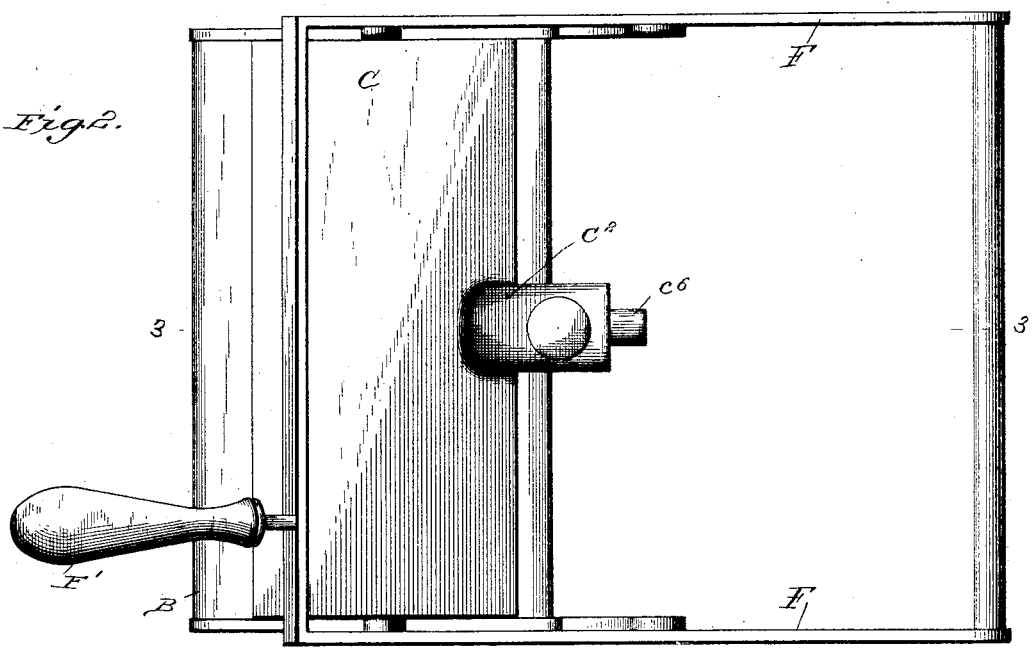
Figure 3:
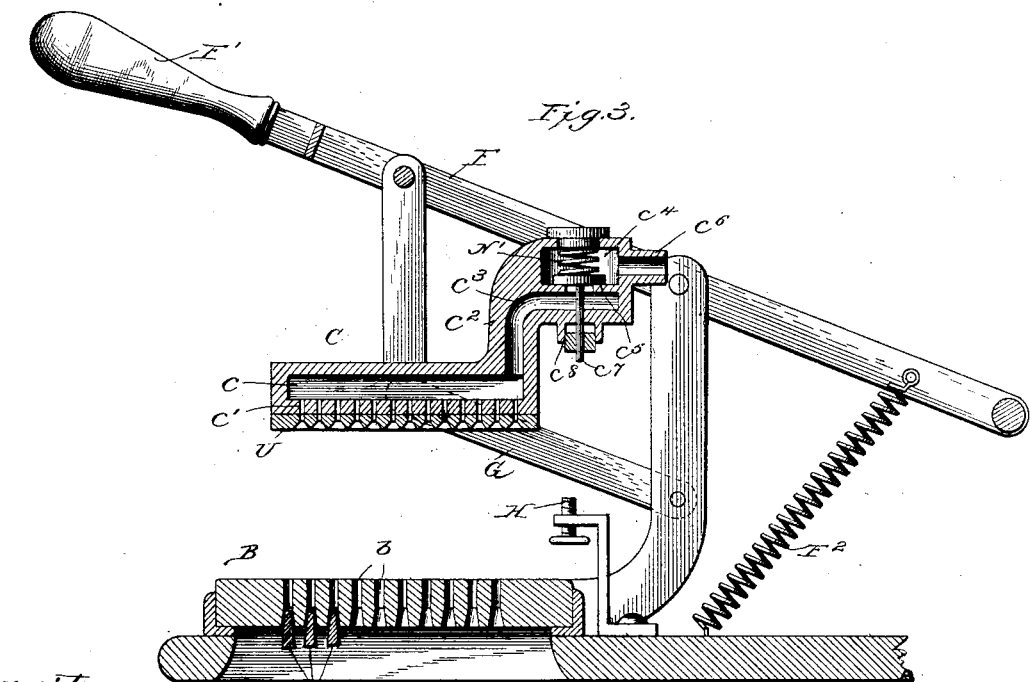
Figure 4:
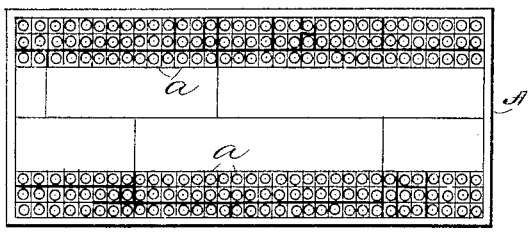
Figure 5:
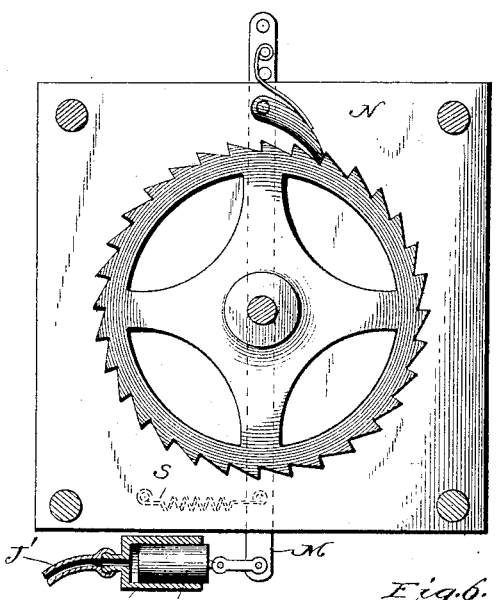
Figure 6:
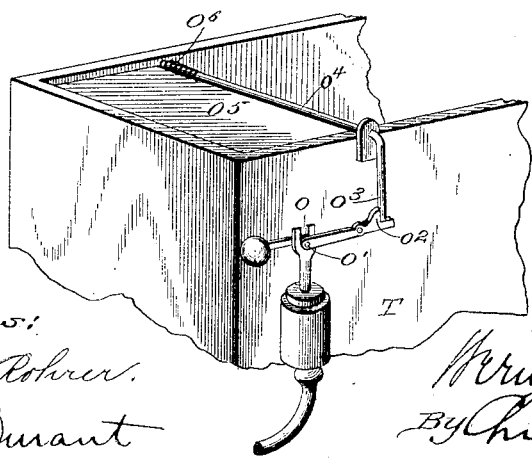
Figure 7:
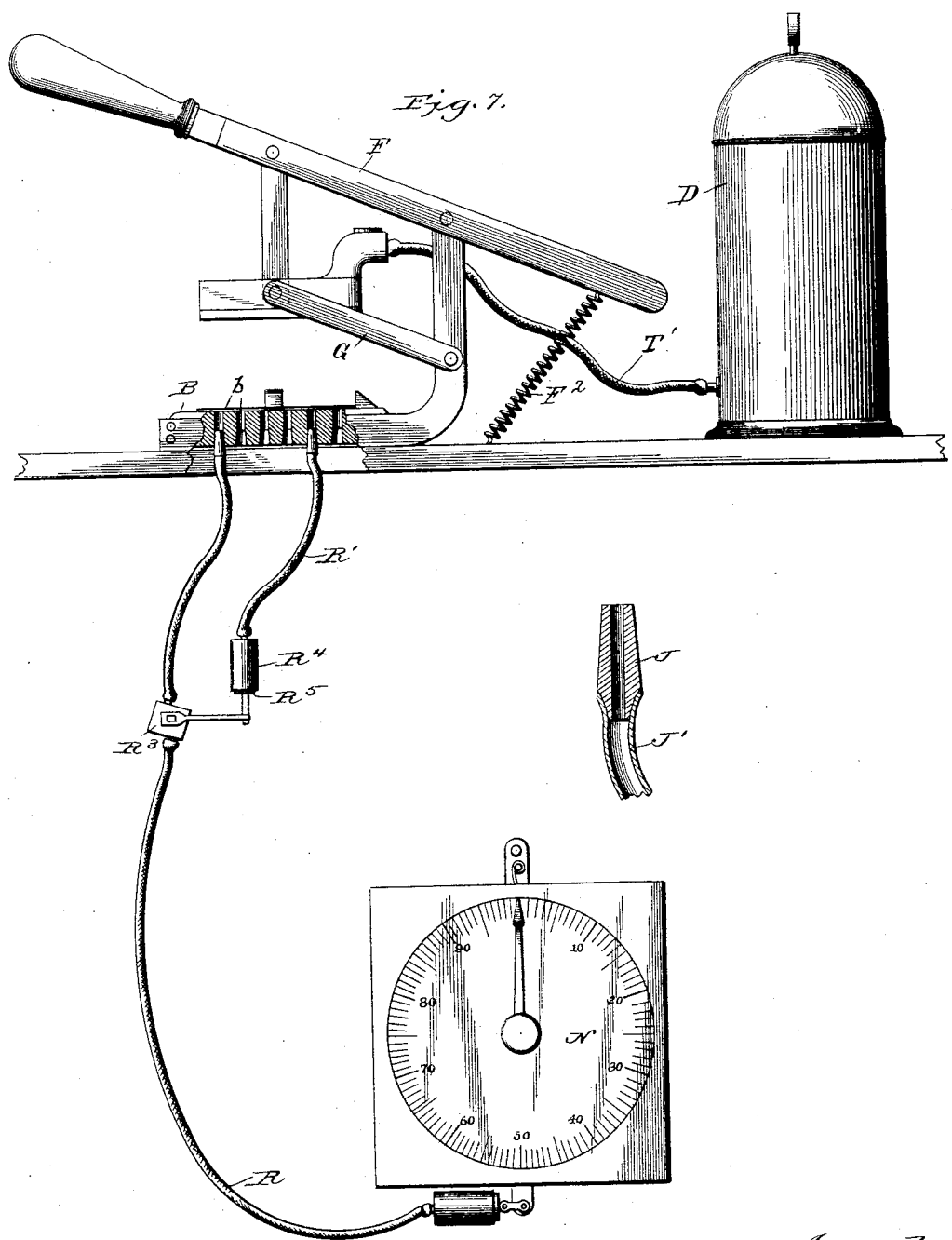
Figure 8:
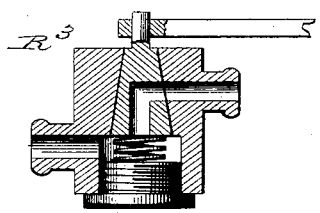
Figure 9:
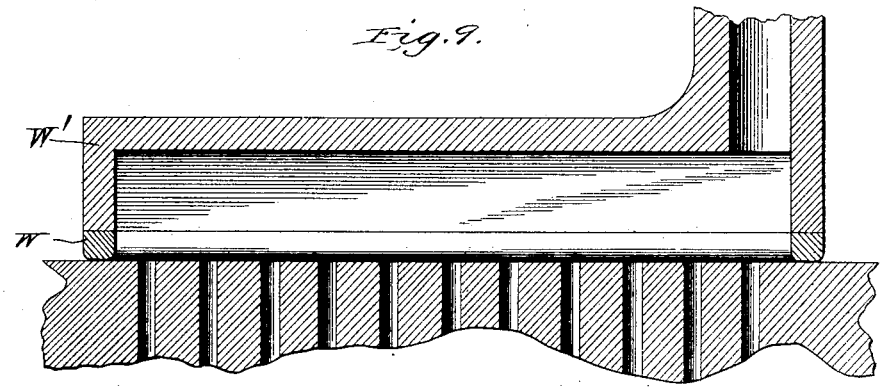

In the accompanying drawings: Figure 1 represents a perspective view of the principal parts of an outfit or apparatus embodying my present invention, that is to say, it shows the air reservoir and compressor, the perforated record cards, the press, so called, in which the cards are placed, and with which they co-operate, the counters and the sorting boxes. Fig. 2 is a plan of the press; Fig. 3 a sectional view of the same taken on the line 3—3, Fig. 2. Fig. 4 is a plan view of one of the cards. Fig. 5 is a detail view of one of the counters showing the manner in which it is operated. Fig. 6 is a detail view showing the manner in which the sorting boxes are operated. Fig. 7 is a diagrammatic view illustrating the use of relay valves in the system. Fig. 8 is a detail sectional view of one of the relay valves. Fig. 9 is a view of a modification of the platen.

Similar letters of reference in the several figures indicate the same parts.

The letter A indicates one of the record cards used in my system. Like the card described in my former patent, it is preferably made of paper and has one of its surfaces divided or marked off into spaces *a*, as shown, each space indicating some statistical item which the card may be used to record. When any of these spaces is punched out the resulting perforation constitutes what has been hereinbefore referred to as an index-point.

B indicates the bed plate and C the movable platen of what I term the "press." The bed plate is provided with apertures $b$ corresponding in number and position to the spaces designated on the record card, and adapted to register, when the card is placed in position upon said bed plate, with as many perforations as may be punched in said spaces.

The movable platen C is about of the same dimensions horizontally as the bed plate B. An air chamber or space $c$ is formed in it and from this space extends a series of apertures or passages $c'$ corresponding in number and position to the apertures $b$ in the bed plate B. Instead of being provided with this space $c$, the platen may be provided with an open or recessed face adapted to make contact at its edges only, as shown in Fig. 9. The stem $c^2$ of the platen is provided with a duct or passage $c^3$ leading to the chamber $c$, with a valve chamber $c^4$ containing a valve $c^5$ and with a nipple $c^6$ for the attachment of a tube (preferably a flexible wire covered rubber tube T') that is connected at its other end to a compressed air reservoir D, in which pressure is constantly maintained by means of an air pump E, or equivalent means.

For the purpose of insuring the even descent of the platen upon the bed plate it is preferably, as in my former patent, mounted upon swinging parallel links F, G, as shown, one of said links F, being provided at one end with an operating handle F' and at the opposite end with a counter spring F² whose tendency is to keep the platen normally elevated.

The valve $c^5$ seats downward and its stem $c^7$ extends out through a gland or stuffing box $c^8$ in position to strike a stop H, when the platen is fully depressed. I preferably make this stop adjustable, as shown, in order that it may be made to operate upon the valve just at the proper time.

Where it is desired to merely count the various statistical items recorded by punchings in the record cards, those apertures in the bed plate which it is known from the subject matter treated will not be required to be used, are closed by means of solid conical plugs I, shown in Fig. 3, while in each of such apertures as are to be used is mounted a hollow plug J which is connected by a flexible rubber tube J' to a suitable translating device actuated by pressure admitted to said tube and in turn operating a suitable mechanical counter; an example of such a translating device so operating being a cylinder K containing a piston L which is adapted to operate the prime mover M of a mechanical counter N.

The apparatus being ready for operation, each record card is in turn placed upon the bed plate and properly centered by suitable guides and stops attached to the latter, after which the movable platen is brought down by means of the handle so as to confine the card between the platen and the bed plate and bring the corresponding apertures in said parts in alignment with each other and with the perforations in the card. By the time close contact is made between the card and the surfaces between which it is clamped, the stem of the valve strikes the stop H and the valve is opened, thus permitting the compressed air to fill the space or chamber in the platen and rush out through the aligned apertures or channels and into the tubes J' and cause the pistons in the piston cylinders to be driven forward and advance the counters one point. The lifting of the platen again will cause the valve to close by the pressure of the air, aided if need be by a small spring N', and the pistons in the piston cylinders will be brought back to first position by the stress of suitable springs $s$ applied to the prime movers of the counters, as will be readily understood.

Where it is desired to not only count the various statistical items recorded on the cards, but to also sort the cards into groups, for instance into "native" and "foreign," it is only necessary that for each perforation in the record cards representing one of the groups or divisions there shall be inserted in the corresponding aperture in the bed plate a hollow plug having connected to it a flexible tube leading to the piston cylinder of a sorting box, such as shown at T in Fig. 6. The piston of this piston cylinder is provided with a slotted or forked stem O in which rests a pin O' projecting from a pivoted weighted catch O², that is designed to engage with an arm O³ of a shaft O⁴ which carries the lid O⁵ of one of the sorting boxes and has connected to it a spring O⁶ which tends to turn the shaft and throw open the lid.

When the piston is driven outwardly by the force of the air pressure, it turns the catch O², releases the arm and permits the spring to raise the lid and open the box, and then when the operator takes the record card from the press, he slips it into the open sorting box and closes the lid thereof leaving the apparatus ready for disposing of the next card. The automatic raising of the sorting box lid in the manner described, not only renders that particular box accessible but acting also as an indicator serves to apprise the operator that the apparatus is in proper working condition, and should at any time a lid fail to rise upon the operation of the press, it would at once denote that the record card had not been properly introduced, or been properly centered, or that some other part of the apparatus was out of order.

That there may be perfect contact between the record card and the platen and bed plate of the press and consequently no escape of air around the edge of the card, nor through apertures in the press that are not in alignment with the perforations of the card, I preferably face the platen with soft rubber as shown at U, in Figs. 1 and 3, and bevel the portions of the rubber between the apertures as shown, in order that when put under compression they will not by lateral displacement obstruct the free passage of the air. Of course the faces of the platen and bed plate might be made so true and caused to approach so accurately as to obviate the possibility of any material escape of air, but I prefer to employ the soft rubber facing as it does not require such a nice construction and adjustment of the parts. The bed plate may also be faced with soft rubber, if desired, but the facing of the platen only will generally be found to be sufficient. Where the modified form of platen shown in Fig. 9 at W' is employed its contacting edge is also preferably faced with soft rubber as at W.

It is obvious that where it is desired to count or distribute or to both count and distribute, the cards in accordance with the combination of perforations in the cards indicating but a single statistical item as "white—male" for instance, a system of relays may be used corresponding to the system of electric relays employed in my former patented invention. The principle involved in such an arrangement is of course that of requiring the concurrent or simultaneous action of all the mechanism controlled by the index points or perforations of the card embraced in the combination, in order to cause the actuation of the counter or sorting box, or both, designed to be effected by such particular combination. This will be fully understood by reference to Fig. 7, wherein B represents the bed plate of the press; R, an air tube corresponding to the perforation designating "male" in the record card; R', an air tube corresponding to the perforation designating "white" in said card. N is a counter adapted to be actuated by the piston of a piston cylinder connected to the end of the tube R; $R^3$, a normally closed valve constructed as shown in Fig. 8, interposed in the tube R. $R^4$ is a piston cylinder connected to the tube R' and having its piston $R^5$ connected to the operating lever of valve $R^3$. It is seen that unless the pressure is admitted to both tubes R and R' concurrently, the counter will not be operated, for if pressure is admitted to the tube R only, the valve $R^3$ checks its progress, while on the other hand, if pressure be admitted to the tube R' alone, the valve $R^3$ will be opened, but vainly, as there is no pressure in the tube R to operate the counter. After the cards have been thus sorted by combinations into groups the cards constituting each group may be sorted into still further subdivisions or groups by passing them again through the apparatus, as will be readily understood.

Having thus described my invention, what I claim as new is—

1. In a system, such as described, the combination with the separate record cards provided with perforations representing items or characteristics of the individual or unit, a fluid pressure apparatus having ducts or passages leading therefrom, and a series of sorting boxes connected to said ducts or passages and operated by pressure therein, whereby, as each card is caused to cooperate with said fluid pressure apparatus, a sorting box is operated ready to receive it; substantially as described.

2. In a system such as described, the combination with a record card or strip, fluid pressure controlling apparatus and a system of ducts or passages connected thereto a translating device connected to one designated duct or passage, a counter or other mechanism to be operated actuated by said translating device, a valve interposed in said designated duct or passage and a translating device connected to another duct or passage operating to control the valve in said first mentioned duct or passage, whereby the counter or other mechanism can only be operated by pressure in both designated ducts or passages simultaneously; substantially as described.

3. The combination with a perforated card or strip, a movable platen having passages in communication with a source of fluid pressure, a bed plate and ducts or passages leading therefrom, translating devices operated by pressure admitted to such ducts or passages, and counters controlled by said translating devices; substantially as described.

4. The combination with a perforated card or strip a movable platen having passages in communication with the source of fluid pressure, a bed plate and ducts or passages leading therefrom, translating devices actuated by pressure admitted to such ducts or passages and a valve for controlling the admission of pressure to the platen; substantially as described.

5. The combination with a perforated card or strip, of a movable platen having passages in communication with the source of fluid pressure, a pressure controlling valve carried by said platen, a bed plate and ducts or passages leading therefrom, and translating devices actuated by pressure admitted to such ducts or passages; substantially as described.

6. The combination with a perforated card or strip, of a movable platen having passages in communication with a source of fluid pressure and faced with a yielding material, a bed plate and ducts or passages leading therefrom and translating devices operated by pressure admitted to said ducts or passages; substantially as described.

7. The combination of the perforated card or strip, the compressed air reservoir, the movable platen with its air passages and valve, the bed plate and the ducts or passages leading therefrom; substantially as described.

8. The combination of the platen, with its air passages and valve, the bed plate having ducts or passages corresponding to those of the record card or strip, and a stop for opening the valve as the platen completes its stroke; substantially as described.

9. The combination with the perforated record card or strip, of the platen having the air passages and valve, and a yielding face and the bed plate provided with ducts or passages; as described.

10. The combination with the platen having air passages, the valve, and an elastic face, of the bed plate provided with the ducts or passages and the stop for opening the valve; substantially as described.

11. The combination with the platen having the air passages and the valve, of the bed-plate having the ducts or passages and an adjustable stop for opening the valve; substantially as described.

12. The combination with the platen having the air passages and a yielding face, of the valve carried by the platen, the bed plate provided with the ducts or passages and the stop for opening the valve; substantially as described.

13. The combination with the platen having the air passages and a yielding facing, of the valve carried by the platen, the bed plate provided with the ducts or passages and the adjustable stop for opening the valve; substantially as described.

14. The combination with the reservoir or source of fluid pressure, of the movable platen connected to said reservoir by a flexible connection and having the chamber or passages for receiving fluid pressure, the valve carried by said platen, the bed plate having the ducts or passages, the stop for opening the valve, and translating devices operated by pressure admitted to the ducts or passages aforesaid; substantially as described.

15. The combination with the perforated card or strip, of the platen in communication with the source of fluid pressure, the bed plate and ducts or passages leading therefrom, translating devices actuated by pressure admitted to said ducts or passages, and sorting boxes having their lids controlled by such translating devices; substantially as described.

16. The combination with a perforated card or strip, of a platen in communication with the source of fluid pressure, a bed plate and ducts or passages leading therefrom translating devices actuated by pressure admitted to said ducts or passages, and the counters and the lids of the sorting devices controlled by such translating devices; substantially as described.

17. The combination with a perforated card or strip, of a movable platen in communication with the source of fluid pressure, a bed plate and ducts or passages leading therefrom, the hollow plugs forming portions of such ducts or passages and the solid plugs for closing the ducts or passages that are not desired to be used; substantially as described.

18. The combination with a perforated card or strip of the platen in communication with the source of fluid pressure, the bed plate and the ducts or passages connected thereto, a translating device in one of said ducts or passages, a counter controlled by said translating device, a translating device in another of such ducts or passages and a valve interposed in the first mentioned duct or passage and controlled by said last mentioned translating device, substantially as described, whereby the counter is prevented from being operated except by the simultaneous action of the translating devices in both ducts or passages.

19. The combination with the platen and bed plate constituting the press, of the flexible tubes connected to the bed plate, the piston cylinders and their pistons connected to said tubes, and the counters to whose prime movers said pistons are connected; substantially as described.

20. The combination with the sorting box, of its lid, the arm and spring cooperating with said lid, the catch for engaging the arm and the piston for operating the catch; substantially as described.

HERMAN HOLLERITH.

Witnesses:
THOMAS DURANT,
ALEX. S. STEUART.